(12) United States Patent
Diestelhorst et al.

(10) Patent No.: US 10,445,238 B1
(45) Date of Patent: Oct. 15, 2019

(54) ROBUST TRANSACTIONAL MEMORY

(71) Applicant: Arm Limited, Cambridge (GB)

(72) Inventors: Stephan Diestelhorst, Cambridge (GB); Wei Wang, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/960,927

(22) Filed: Apr. 24, 2018

(51) Int. Cl.
*G06F 12/08* (2016.01)
*G06F 12/0815* (2016.01)
*G06F 12/0804* (2016.01)
*G06F 9/4401* (2018.01)
*G06F 9/46* (2006.01)

(52) U.S. Cl.
CPC ........ *G06F 12/0815* (2013.01); *G06F 9/4401* (2013.01); *G06F 9/467* (2013.01); *G06F 12/0804* (2013.01); *G06F 2212/1024* (2013.01); *G06F 2212/608* (2013.01)

(58) Field of Classification Search
None
See application file for complete search history.

(56) References Cited

U.S. PATENT DOCUMENTS

| | | | | |
|---|---|---|---|---|
| 7,805,632 | B1* | 9/2010 | Luke | G06F 11/1471 714/36 |
| 9,513,829 | B1* | 12/2016 | Wang | G06F 16/2343 |
| 9,645,932 | B1* | 5/2017 | Bono | G06F 12/0833 |
| 9,697,219 | B1* | 7/2017 | Wang | G06F 16/1734 |
| 10,009,438 | B2* | 6/2018 | Das | H04L 67/2842 |
| 2006/0224597 | A1* | 10/2006 | Fitzpatrick | G06F 21/6245 |
| 2014/0237172 | A1* | 8/2014 | Shah | G06F 9/466 711/103 |
| 2014/0310483 | A1* | 10/2014 | Bennett | G06F 12/00 711/154 |
| 2016/0344834 | A1* | 11/2016 | Das | H04L 67/2842 |
| 2019/0004851 | A1* | 1/2019 | Doshi | G06F 9/466 |

OTHER PUBLICATIONS

Christos Kozyrakis, Lecture 20: Transactional Memory, https://www.cs.cmu.edu/afs/cs/academic/class/15418-s12/www/lectures/20_transactionalmem.pdf, CMU 15-418: Parallel Computer Architecture and Programming (Spring 2012).

* cited by examiner

*Primary Examiner* — Kevin Verbrugge
(74) *Attorney, Agent, or Firm* — Leveque IP Law, P.C.

(57) ABSTRACT

Methods and apparatus are provided for executing a transaction in a data processing system, responsive to each memory access of the transaction, a transaction log is updated in a persistent memory. After execution of the transaction and when the transaction log is complete, the transaction log is marked as 'pending'. When all values modified in the transaction have been written back to the persistent memory, the transaction log is marked as 'free'. When, following a reboot, a transaction log is marked as 'pending', data stored in the transaction log is copied to the persistent memory at addresses indicated in the transaction log. After the copying is complete, the transaction log is marked as 'free'. Cache values modified in the transaction may be written back to persistent memory when evicted, and values read in the transaction may be read from the cache rather than from the transaction log.

20 Claims, 9 Drawing Sheets

ROBUST TRANSACTIONAL MEMORY

BACKGROUND

In a data processing system, multiple computation threads may share a common data resource such as a memory. Copies of a data value associated with a memory address may be stored at different locations in the data processing system, such as caches. In such systems, a coherence mechanism may be used to monitor the current status and ensure that out of date data value are not used.

In some situations, a single thread may require data at a set of memory addresses not be changed by any other thread while a sequence of operations is performed. This sequence of operations is referred to as a 'transaction'. The transaction is said to have 'multi-threaded atomicity', in that the memory accesses appear to have happened in a single operation that cannot be split by other threads. One way to ensure that memory is not changed by other threads is to block access to the memory by all other threads. However, this is not efficient, since threads that access memory addresses outside of the restricted set of addresses will be blocked unnecessarily. Another approach is to buffer write operations in a 'redo log' until the operation is complete and then write all of the data in a single operation provided no other thread has accessed the restricted memory. This is sometimes called a 'lazy' approach. A further approach is to perform the write operations, but to record the overwritten values in an 'undo' log. The write operation can then be undone if any other thread has accessed the restricted memory. This is sometimes called a 'eager' approach.

In above approaches, logs may be maintained in volatile or persistent (non-volatile) memory. However, neither each approach is optimal. If the logs are maintained in volatile memory they will be lost in the event of a power failure and the memory may be corrupted. If the logs are maintained in a non-volatile memory, memory accesses within the transaction will be redirected to the non-volatile memory, which is typically much slower than a volatile memory such as a cache. This will slow down execution.

There exists a need for a transactional memory system that maintains efficiency and yet is robust in the presence of a power failure.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
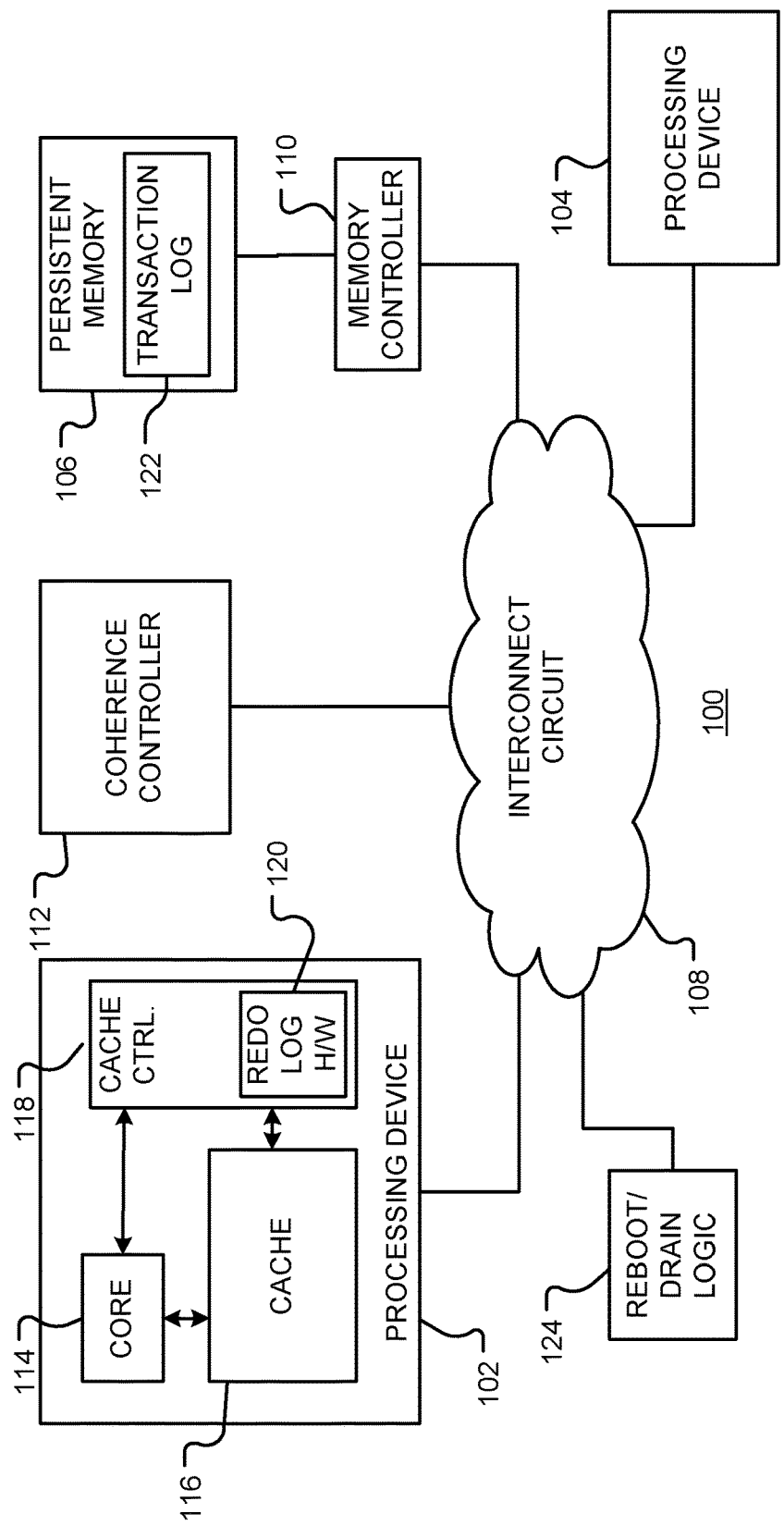
FIG. 1 is a diagrammatic representation of a data processing system, in accordance with various representative embodiments.

The various apparatus and devices described herein provide a hardware transactional memory that is robust in the presence of a power failure or other reboot.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Herein, the term 'persistent memory' shall mean any memory the contents of which are available after a power cycle or other reboot. 'Persistent memory' shall include non-volatile memory such as core memory, flash memory, magneto-resistive random access memory (MRAM), ferroelectric RAM (F-RAM), phase-change RAM (PCRAM), resistive RAM (ReRAM), correlated-electron RAM (CeRAM) and other memory technologies that are inherently non-volatile. In addition, 'persistent memory' shall include main memory that is automatically backed-up up to non-volatile memory (such as flash memory) and reloaded following a power cycle. For example, non-volatile, dual inline memory module (NVDIMM-N) combines a DIMM, DRAM, flash storage and small power supply in the same module.

For conventional transaction memory that is implemented using a redo log, the data is first written to the redo log and then to the data region. With persistent memory, transactions not only need to have multi-threaded atomicity, they also need to have power failure atomicity. That is, in the event of a power failure all of the transaction must be completed or none of the transaction. The ability to withstand a power failure is referred to herein as being 'robust'. Thus, to make transactions power failure atomic, the transactions need to be made robust. In one implementation the redo log is stored in persistent.

An aspect of the present disclosure provides an efficient hardware implementation of robust transactions using caches that (i) avoids persisting data within a transaction and (ii) avoids redirections (to persistent memory) for read operations within the same transaction.

FIG. 1 is a diagrammatic representation of a data processing system 100 in accordance with an embodiment of the present disclosure. Referring to FIG. 1, processing devices 102 and 104 share a common data resource-persistent memory 106 in this embodiment. Any number of processing devices and data resources may be present. The processing devices access persistent memory 106 via an interconnect circuit 108 and a memory controller 110. Memory access requests by processing devices 102 and 104 are monitored and handled by coherence controller 112. A processing device, such as device 102, may include one or more processing cores 114, one or more caches 116 and cache controller 118.

In the embodiment shown in FIG. 1, cache controller 118 includes, or is in communication with, transaction log hardware 120. Transaction log hardware 120 is operable to maintain a transaction log 122, in persistent memory 106. Transaction log 122 may be a redo log, for example. Much like cache 116, transaction log 122 contains a table of address tags and associated data and may be thought of as a shadow cache. The transaction log may be stored in a main memory, as shown, or in a separate memory. During a transaction, core 114 may access data in cache 116, which is much more efficient than accessing persistent memory 106. Cache 116 is a volatile memory whose contents may be lost during a power failure. However, transaction log 122 is not lost during a power failure and may be used to recover from a power failure during a transaction.

An example code snippet for a transaction is listed below. In this transaction, writes to addresses a and b will first be written to the redo log and made persistent.

```
tx_begin
   write (A, 5);
   read (A);
   write (B, 11);
   tx_commit
tx_end
```

The instruction tx_begin marks the start of section of code to be treated as atomic transaction. The instruction tx_end marks the end of the section. The instruction tx_commit instructs the data processing system that the transaction is complete, and the memory writes should be made persistent by copying to the persistent memory. The set of instructions is referred to as a transaction and it is desired that the instructions appear to have been executed as a single, i.e. atomic, instruction. For example, no other thread should read addresses A and B unless both have been written or neither has been written. Some of these restrictions are handled automatically by the coherence control mechanism, but this mechanism handles the current state of the system. Once data is written back to memory and evicted from all caches (or marked invalid), there is no record of the change.

If another thread requests write access to the associated address, an error is flagged and either the transaction is aborted or the other thread is stalled. Herein, 'another thread' may be a thread that is part of the same process as the thread performing the transaction, or may be a thread of different process.

Data processing system 100 also includes reboot logic 124. Following a reboot of the system, reboot logic 124 checks to see if transaction log 122 is 'pending', that is, if there are any pending writes to be performed. If so, transaction log 122 is used to update persistent memory 106. If, following a reboot, transaction log 122 is marked as 'in-use' but not committed, the contents of the log are discarded and the memory is not updated. For example, reboot logic 124 may cause the status of the log to be changed from 'in-use' to 'free'.

Other elements of the data processing system have been omitted from FIG. 1 for the sake of clarity.

Figure 2:
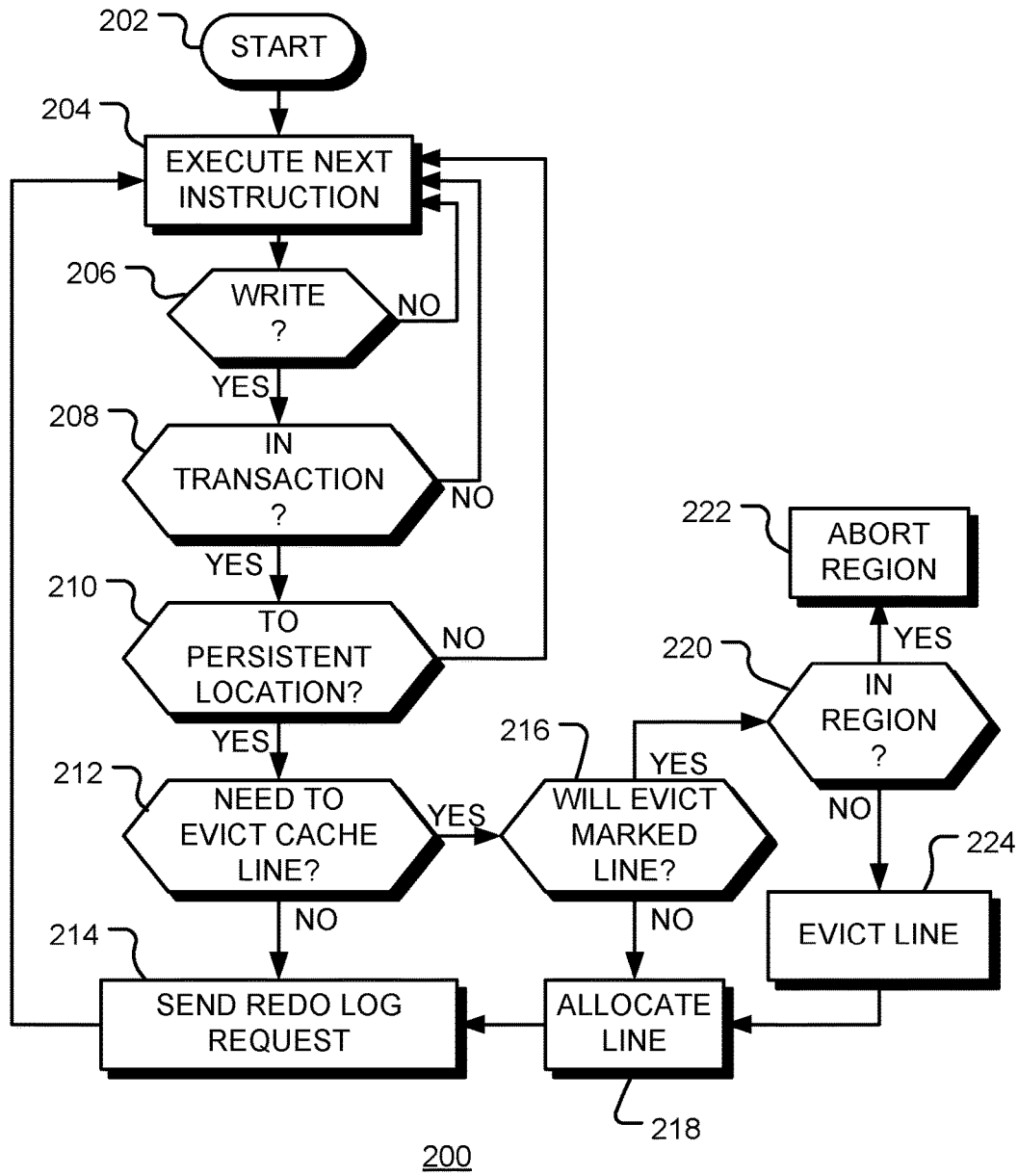
FIG. 2 is a flow chart showing operation of a write instruction, in accordance with various representative embodiments.

FIG. 2 is a flow chart 200 showing operation of a write instruction, in accordance with various representative embodiments. Following start block 202, an instruction is executed at block 204. If the instruction is a write instruction, such as write (A, 5), (which is an instruction to write a value '5' to memory address 'A') as indicated by the positive branch from decision block 206, flow continues to decision block 208. Otherwise flow returns to block 204 and the next instruction is executed. If the instruction is within a transaction and the address corresponds to a persistent location, as depicted by the positive branches from decision blocks 208 and 210, flow continues to decision block 212, otherwise flow returns to block 204 and the next instruction is executed. At this point it is known that the write should be made to the redo log rather than directly to persistent memory. In this example, the transaction log is maintained in persistent memory. If it is not necessary to evict a cache line to enable a new cache line to be allocated for the address, as depicted by the negative branch from decision block 212, the data is written to the line and the line is marked as corresponding to a log entry of a transaction. A request is then sent at block 214 to update the transaction log stored in persistent memory. Otherwise, as depicted by the positive branch from decision block 212, a line must be evicted from the cache. If an unmarked line is available for eviction (i.e. a line not that is not associated with a transaction), as depicted by the negative branch from decision block 216, the line is evicted and allocated to the new entry at block 218. Otherwise, as depicted by the positive branch from decision block 216, there is no space for the new line in cache and flow continues to decision block 220 where it is determined if the transaction associated with the marked line to be evict has been committed. This may be done by checking the 'in-region' flag, for example. If not, as depicted by the negative branch from decision block 220, the transaction is aborted at block 222. However, if the cache line to be evicted is part of a committed transaction, for which a transaction log exists, the line may be evicted at line 224 to make space in the cache for the new line.

In an alternative embodiment, a request may be issued to drain the transaction log associated with the line to the persistent memory. Other lines in the cache associated with the same transaction as the evicted line may then be unmarked.

Figure 3:
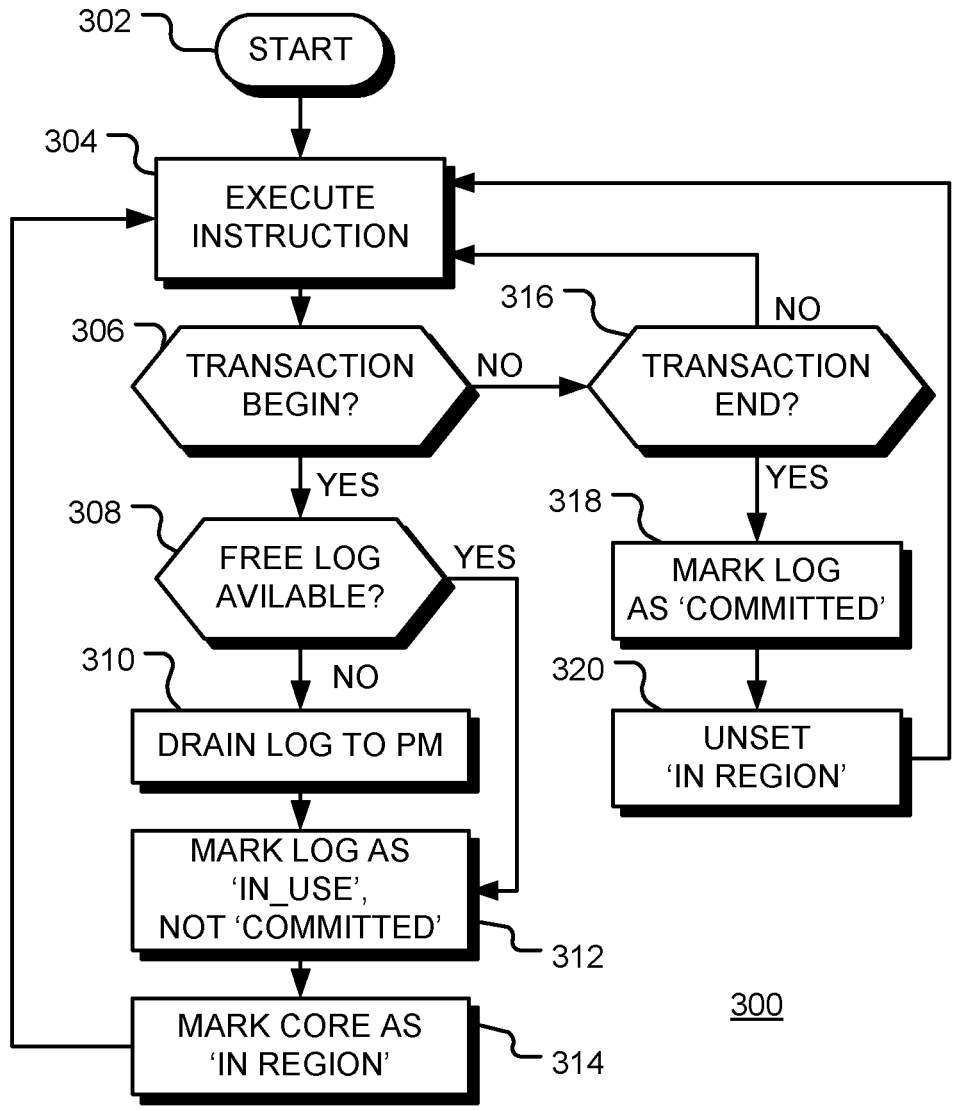
FIG. 3 is a flow chart of a method for implementing robust transactional memory in a data processing system. in accordance with various representative embodiments.

FIG. 3 is a flow chart 300 of a method for implementing robust transactional memory in a data processing system, in accordance with various embodiments of the disclosure. Following start block 302 in FIG. 3, an instruction is executed at block 304. If this an instruction, such as tx_begin, that marks the start of persistent section of code (to be treated as atomic transaction), as depicted by the positive branch from decision block 306, it is desired that a transaction log be maintained in persistent memory. If no 'free' log is available, as depicted by the negative branch from decision block 308, a log that is marked as 'committed' is drained to persistent memory at block 310. The free log is marked as 'in_use' and 'not committed' at block 312, to indicate that it is in use but incomplete. A core flag is set at block 314 to indicate the subsequent instructions are within the transaction code region. Flow then returns to block 304. If the instruction is not the start of a transaction, as depicted by the negative branch from decision block 306, flow continues to decision block 316 where it is determined if this instruction is an instruction, such as tx_end, that marks the end of a transaction code region. If so, as depicted by the positive branch from decision block 316, flow continues to block 318. Otherwise, flow then returns to block 304. At block 318, the transaction log is marked as 'committed', to indicate that it is complete and should be used in the event of a power cycle or other reboot. At block 320, the core flag is reset to indicate that subsequent instructions are not part of a transaction.

During the process, memory accesses by other threads may be monitored to detect conflicts. Example conflicts include a transaction read from an address written by another thread after the start of the transaction, or an read by another thread from an address written to in the transaction. As discussed above, the conflict check may be performed as part of the coherence mechanism. When a conflict is detected, the transaction may be aborted or restarted.

Lines in the cache that are associated with read or write operations within a transaction are marked as being part of the transaction log. For example, lines may be marked with an identifier of the transaction log with which they are associated.

When the transaction is complete, the values in the cache are committed to persistent memory as they are written back to memory. Lines written back to memory are unmarked. Lines may be written back when a line is evicted from the cache, however, lines may only be evicted when the 'in region' flag is not set. When all marked lines have been written back, the transfer is complete and the transaction log is freed. In the event of a power failure before all marked lines in the cache are written back to the persistent memory, the transaction log in persistent memory may be used to update memory when power is returned or a reboot is performed. In prior systems, a power failure at this stage could cause the memory to become corrupted.

For each transaction, a counter may be maintained to indicate the number of cache lines associated with the transaction. The counter may be increment when a line is installed in the cache and decremented when a line is evicted. The counter may be used, in conjunction with the core flag ('in-region' flag) to indicate when all marked lines have been written back to persistent memory. The associated transaction log may then be freed. Alternatively, since every cache line has a Tx_ID field, the number of lines belonging to a particular transaction can be counted, similar to mark-and-sweep garbage collection.

Figure 4:
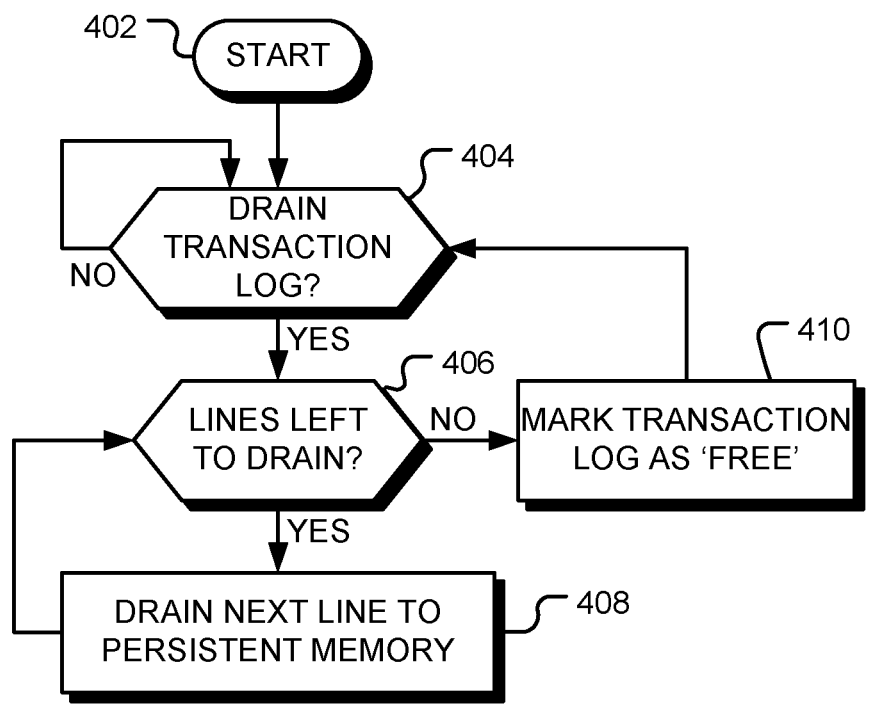
FIG. 4 is a flow chart of a method for committing results of a transaction, in accordance with various representative embodiments.

FIG. 4 is a flow chart of a method for draining a transaction log. A transaction log may be drained at start-up following a reset or power failure. A transaction log may also be drained in response to a request—for example to allow marked lines of a finished transaction to be evicted from a cache or to free a transaction log for a new transaction. Following start block 402, when the transaction log is to be drained, as depicted by the positive branch from decision block 404, flow continues to decision block 406. While there are still more lines left in the transaction log, as depicted by the positive branch from decision block 406, the line is drained, at block 408, by writing data in the line to the data region of persistent memory identified by an address tag in the transaction log. When all lines have been drained, as depicted by the negative branch from decision block 406, the transaction log in persistent memory is marked as 'free' at block 410. All transaction values are then committed to the data region of persistent memory.

Figure 5A:
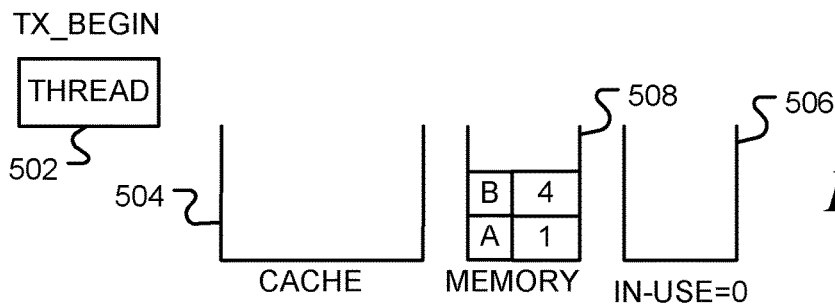
FIGS. 5A-5D illustrate write operations for a transaction, in accordance with various representative embodiments.

FIGS. 5A-5D illustrate write operations for a transaction, in accordance with various embodiments of the disclosure. FIG. 5A shows the state of the data processing system before a tx_begin instruction is received in thread 502. Initially, cache 504 is empty, as is the transaction log 506 in the persistent memory. Transaction log 506 is marked as IN_USE=0 to indicate that is 'free'. In this example, the persistent memory (NVM) 508 contains a value '1' stored at address 'A' and a value '4' stored at address 'B'. When the a tx_begin instruction is executed, transaction log 506 is marked as IN_USE=1. Transaction log 506 may have an identifier, denoted as TX_ID. The identifier may be fixed, such as an address of the log, or may be assigned dynamically to correspond to a thread, core ID, or the like. The TX_ID enable cache lines to be associated with a particular transaction log.

Figure 5B:
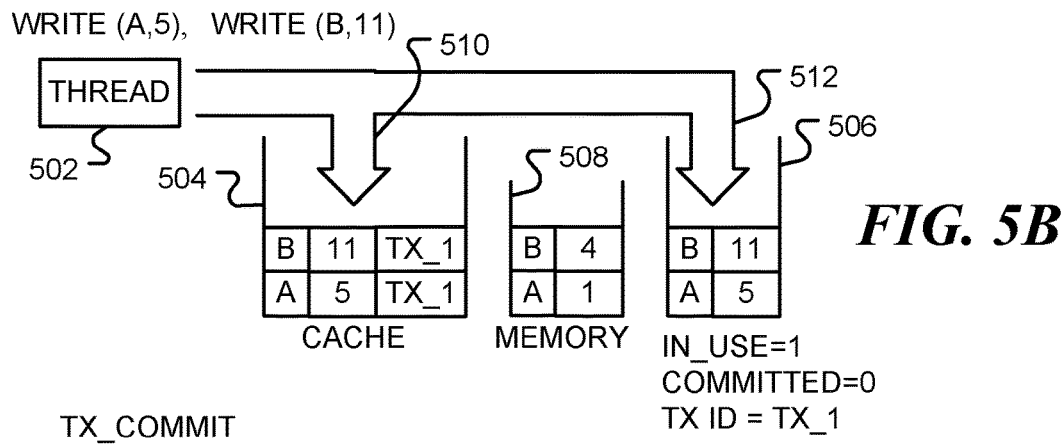

FIG. 5B shows the state of the data processing system when the instructions write (A, 5) and write (B, 11), have been executed within the transaction. As indicated by arrow 510, the values have been written to cache 504 and the cache lines have been marked with the identifier TX_1 to identify which transaction log they are associated with. As discussed above, attempts to evict these lines will result in an aborted transaction or handled in some other way. As indicated by arrow 512, the values are also written to transaction log 506 in the persistent memory. At this time, the values in memory 508 are unchanged. An aspect of the present disclosure is that read operations from address 'A' or address 'B' are directed to cache 504 rather than to transaction log 506 in persistent memory. This simplifies and speeds execution of the read operations. Transaction log 506 is marked as COMMITTED=0 to indicate that data modified in the transaction has not been committed yet.

Figure 5C:
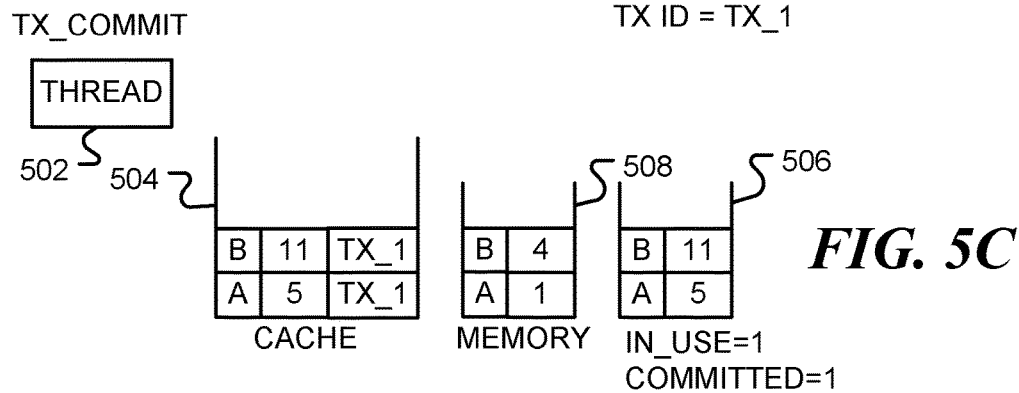

FIG. 5C shows the state of the data processing system when the transaction has ended. It is assumed that no conflicts have occurred, so the transaction log is marked as COMMITTED=1, to indicate that it is complete. The NVM memory 508 has not yet been updated and still contains the original values at addresses A and B. The flags 'IN_USE' and 'COMMITTED' are both set, indicating that write-back of the transaction data to persistent memory is still 'pending'.

Figure 5D:
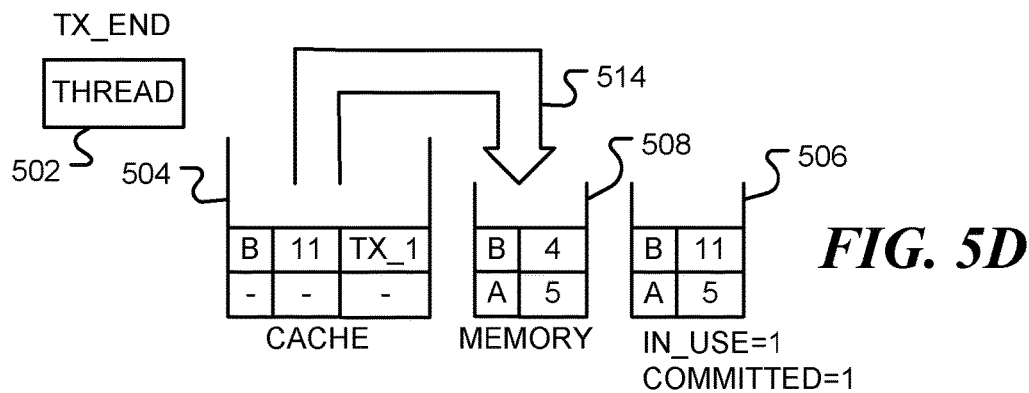

FIG. 5D shows the state of the data processing system at a later time when the value at address 'A' has been evicted from cache 504 and written back to the persistent memory, as depicted by arrow 514. Transaction log 506 still contains the complete results of the transaction in used and containing data from a committed transaction. When all of the marked lines in cache 504 have been written back, memory 508, the transaction log is marked as being 'free', i.e. IN_USE=0. In this way, no explicit draining of the cache or the transaction log is required when data is committed. Rather, data is written back when evicted from the cache normal operation. Thus, marked data may be evicted from the cache provided once the transaction log is marked as 'committed'.

Figure 6A:
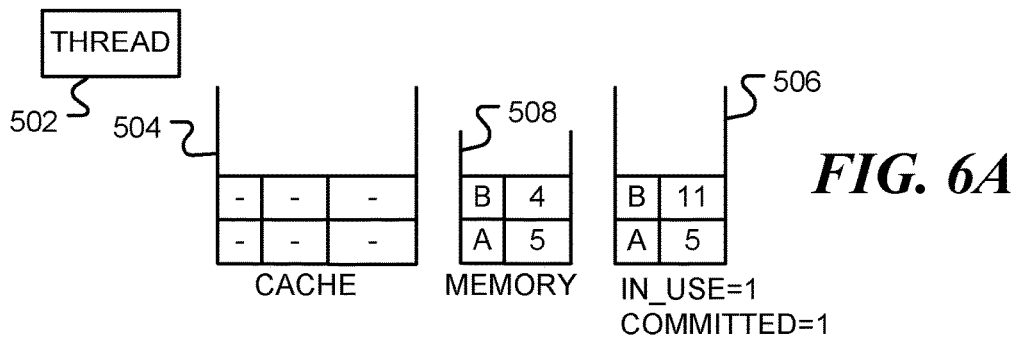
FIGS. 6A-6D illustrate operation of a data processing system following a power failure, in accordance with various representative embodiments.

FIGS. 6A-6D illustrate operation of a data processing system following a power failure, in accordance with various embodiments. A corresponding operation may be performed following a reset of system or in response to an explicit instruction to drain the log. FIG. 6A shows the state of the data processing system when a power failure has occurred before all marked lines are written back to the persistent memory (e.g. as shown in FIG. 5D). When the power fails, the contents of cache log 504 are lost. However, the contents of transaction log 506 persist, as does the marking of the transaction log as IN_USE=1 and COMMITTED=1.

Figure 6B:
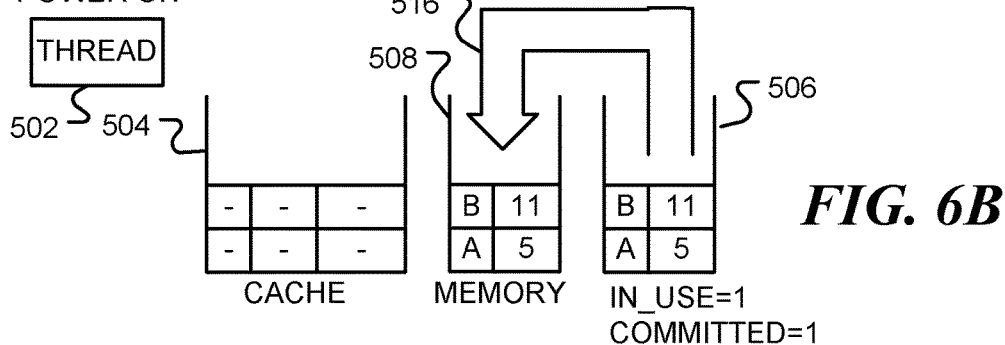

FIG. 6B shows operation of the data processing system when power is resumed. The system detects that transaction log 506 is in use and contains committed data. and proceeds to copy the contents of transaction log 506 to the memory 508, as depicted by arrow 516. In this way, memory 508 is updated with the correct transaction results.

Figure 6C:
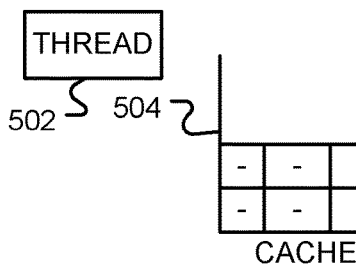

FIG. 6C shows the state of the data processing system when the transfer from transaction log 506 to memory 508 has been completed. Transaction log 506 is marked as being 'free' (IN_USE=0) to prevent overwriting the memory in the event of a further power failure and to allow the log to be used for a future transaction.

Figure 6D:
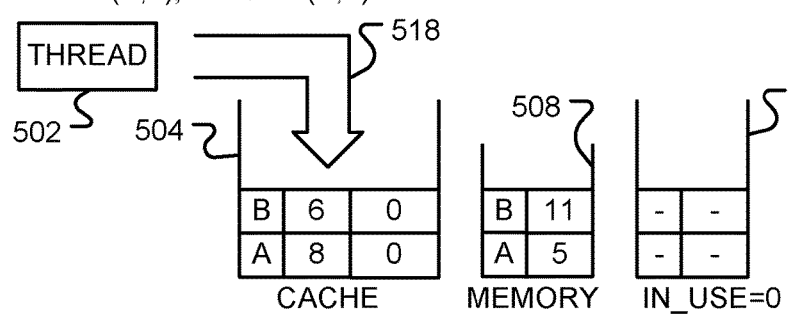

FIG. 6D shows the state of the data processing system when the instructions write (A, 8) and write (B, 6), have been executed outside of the transaction. As indicated by arrow 510, the values have been written to the cache, but the lines are marked as TX_ID=0 to indicate that they are not part of a transaction. These lines operate as normal cache lines and may be evicted as required.

In the approach described above, a combination of cache lines and persistent memory are used to achieve both multi-threaded atomicity and power failure (or other reboot) atomicity of a transaction. Cache lines that are touched by write operations in a transaction are flushed/persisted to a transaction log in a region persistent memory. The region of persistent memory may be the same size as the cache region, for example, and performs like a shadow cache. With this approach, there is no requirement to redirect reads in the same transaction to the transaction log and performance of the data processing system is enhanced.

In one embodiment, the transaction commit operation does not need to flush the cache lines, since the cache lines will eventually be evicted to persistent memory and therefore made persistent. This avoids the need to manually flush the marked lines to make them persistent at the end of the transaction. If a power failure happens in between when the transaction is complete and the data is made persistent, the transaction log entries can be copied over to the data entries at reboot. This approach avoids flushing the data to persistent memory at transaction 'commit' instructions. The approach also avoids redirection of read operations to persistent memory in the same transaction, thereby improving throughput and reducing latency of transactions when compared to conventional approaches.

Figure 7:
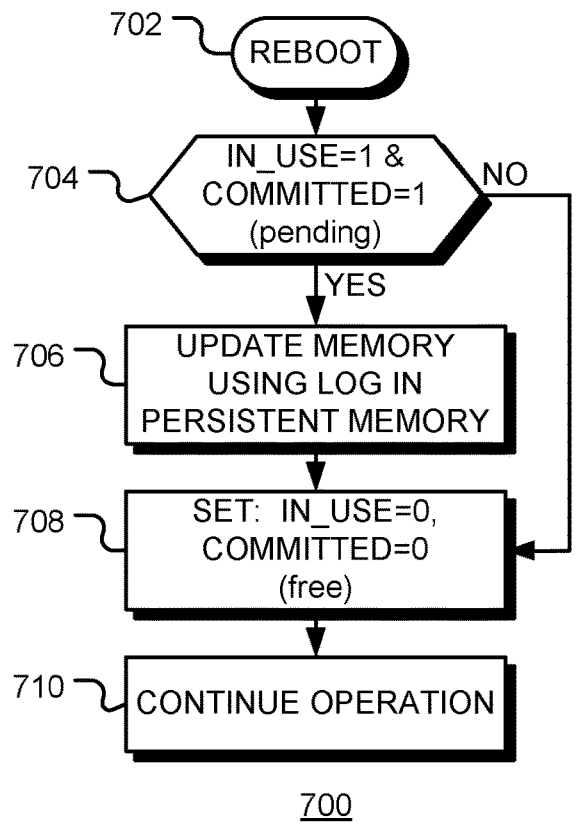
FIG. 7 is a flow chart of a method of operation for a robust transactional memory in a data processing system, in accordance with various representative embodiments.

FIG. 7 is a flow chart 700 of a method for a robust transactional memory in a data processing system in accordance with various embodiments. Following a system reboot at block 702, reboot logic checks if the 'pending' transaction flag is present. That is, a log for which IN_USE=1 and COMMITTED=1 are set. If both flags are set, as depicted by the positive branch from decision block 704, the memory is updated using the transaction log at block 706. The transaction log, which functions similar to a shadow cache, is stored in a persistent memory, such as a non-volatile memory, so the transaction log is available even when the reboot is result of power being restored after a power failure. Once the memory update is complete, the IN_USE flag is set to zero at block 708 to indicate that the log is 'free' and normal operation continues at block 710. If either of IN_USE and COMMITTED is not set, as depicted by the negative branch from decision block 704, the log is either free or incomplete and the memory is not updated. Flow continues to block 708, where the flags are cleared to free the log. Normal operation resumes at block 710. Together, the IN_USE and COMMITTED flags provide a status indicator that indicates the status of the transaction log.

Figure 8:
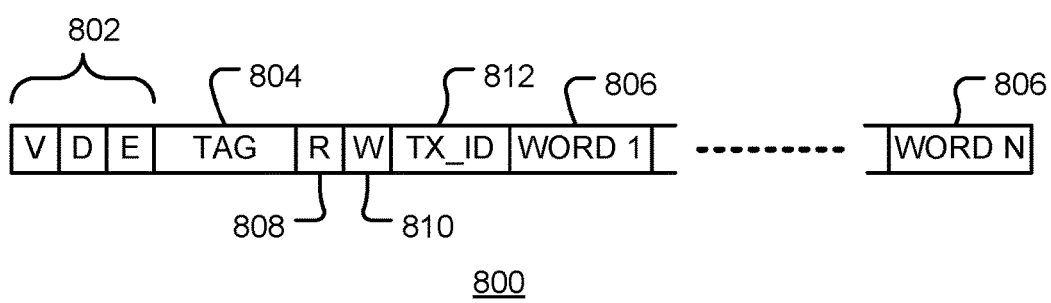
FIG. 8 is a diagrammatic representation of a cache line, in accordance with various representative embodiments.

FIG. 8 is a diagrammatic representation of a cache line in accordance with various embodiments. Cache line 800 includes line condition entries 802 (which indicate, for example, if the data valid or invalid, dirty or clean, unique or shared), an address tag 804 and a number of data words 806. In the embodiment shown, cache line 800 also includes a read bit 808 and a write bit 810. The read and write bits are set when the associated word is read or written during a transaction. The write bits are cleared when a transaction is completed and the associated data has been written back to persistent memory. In an alternative embodiment, the read and write bits are maintained on a finer scale, such as one read bit and one write bit per word. Cache line 800 includes a transaction identifier 812 that indicates which transaction log the line is associated with. This enables operation of multiple transactions. Other, equivalent, arrangements of data within the cache will be apparent to those of skill in the art.

In a further embodiment, for example, the read and write bits may be omitted. Transaction identifier 812 is set to zero (or some other specified value) when the line is not part of a transaction log. Data accessed during a transaction is marked as being in an 'exclusive' or 'modified' condition. 'Modified' lines associated with a transaction still need to be written back to memory. The line condition is changed to 'exclusive' when the line is written back to memory.

Figure 9:
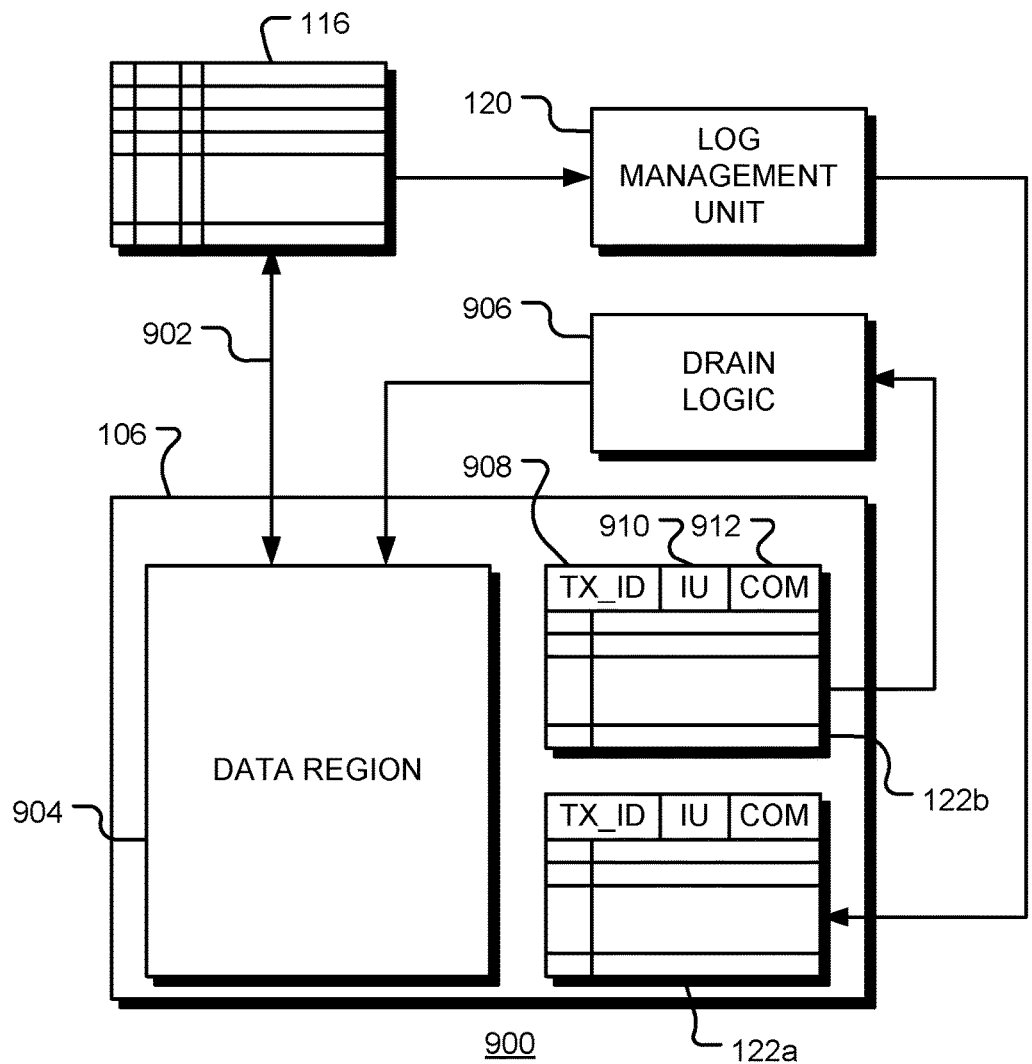
FIG. 9 is a diagrammatic representation of data flow in a data processing system in accordance with various representative embodiments.

FIG. 9 is a diagrammatic representation of data flow in a data processing system 900, in accordance with various representative embodiments. In operation, data 902 is moved between a data region 904 of persistent memory 106 and a cache 116. When a transaction begins, log management unit 120 selects a free transaction log 122a in persistent memory 106. If no free log is available, log drain logic 906 may be signaled to drain an existing committed log, such as 122b, to the data region 904 of persistent memory 106. Alternatively, memory may be allocated for a new transaction log. The log is associated with a transaction identifier 908, an IN_USE flag 910 and a 'COMMITTED' flag 912. Transaction identifier 908 is used associate cache entries with a corresponding transaction log. Together, IN_USE flag 910 and 'COMMITTED' flag 912 form a status indicator that indicates the state of the transaction log.

When data 902 is brought into the cache during a transaction, log management unit 120 creates a corresponding entry in transaction log 122*a*. The entry contains at least the data and an address tag of the data.

At start-up of the data processing system, following a power failure, power cycle, or reset for example, IN_USE flag 910 and 'COMMITTED' flag 912 of each transaction log (122*a* and 122*b*) are checked. If both flag are set for a transaction log, log drain logic 906 is signaled to drain the log to the data region 904 of persistent memory 106. log drain logic 906 may be signaled at other time—for example to free a committed log for use by a new transaction.

Figure 10:
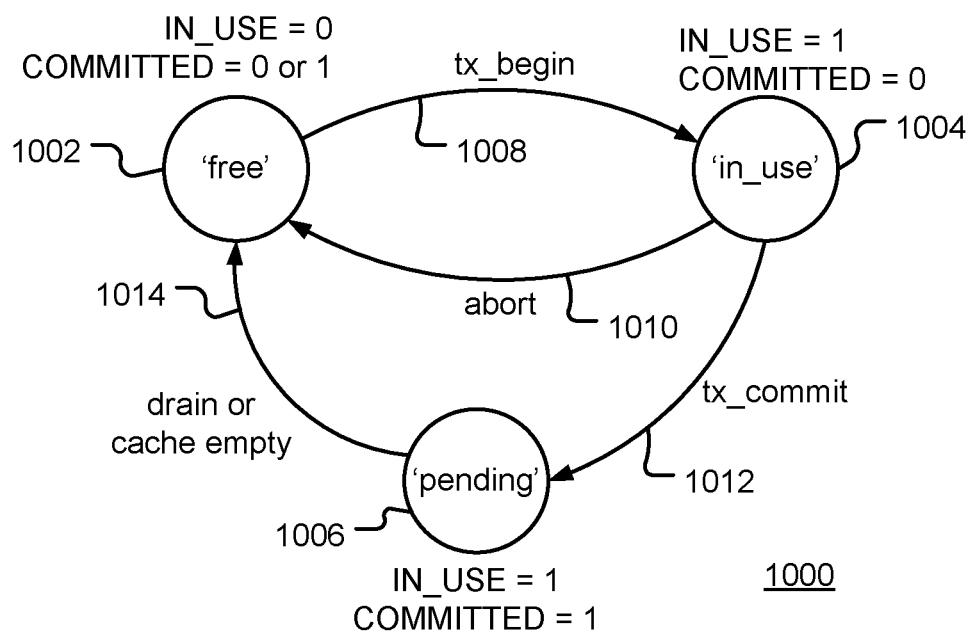
FIG. 10 is a state transition diagram for a transaction log, in accordance with various representative embodiments.

FIG. 10 is a state transition diagram 1000 for a transaction log, in accordance with various embodiments of the disclosure. A transaction log may be in one of three states. State 1002 is a 'free' state, in which the log is not being used. State 1004 is an 'in-use' state, in which log contains transaction data of an active transaction, but that data has not been committed yet. State 1006 is a 'pending' state, in which the log contains transaction data for a transaction that has been completed. As indicated by transition 1008, the log transitions from the 'free' state 1002 to the 'in-use' state 1004 when a tx_begin command, or equivalent, is issued. As indicated by transition 1010, the log transitions from the 'in-use' state 1004 back to the 'free' state 1002 when a transaction is aborted. As indicated by transition 1012, the log transitions from the 'in-use' state 1004 to the 'pending' state 1006 when a tx_commit command, or equivalent, is issued. Finally, as indicated by transition 1014, the log transitions from the 'pending' state 1006 back to the 'free' state 1002 when either the contents of the log have been drained back to the persistent memory, or when all cache lines associated with the transaction have been evicted from the cache and written back to the persistent memory.

The disclosed data processing system provides a number of advantages. Firstly, during a transaction, data may be accessed via cache 116, avoiding the latency associated with accessing persistent memory 106. Secondly, there is no need to drain cache 116 or transaction log 112*a* to persistent memory at the end of a transaction. This avoids the need to block other threads or processes during the draining operation. The transaction is therefore 'non-blocking'. Data is written back when data is evicted from the cache in normal operation. Thirdly, the system is robust with respect to power failure. In event of a power failure before all data is evicted from the cache and made persistent, data is automatically written back from the transaction log when the system is re-booted. Fourthly, the approach may be used to build on and improve existing hardware transactional memories by adding support for non-volatile memories and providing the associated advantages described above.

Various embodiments described herein are implemented using programmed processors executing programming instructions in concert with the disclosed hardware, the configuration and operation of which is broadly described in flow chart and block diagram form. However, those skilled in the art will appreciate that the processes described above can be implemented in any number of variations and in many hardware configurations without departing from the present invention. Such variations are contemplated and considered equivalent.

Accordingly, some aspects and features of the disclosed embodiments are set out in the following numbered items:

1. A method of executing a transaction in a data processing system, where the transaction is performed by a first execution thread and comprises one or more instructions, the method comprising: when, following a reboot of the data processing system, a first transaction log is indicated to be 'pending', where the first transaction log is stored in a persistent memory and is associated with a prior transaction, copying data stored in the first transaction log to a data store at addresses indicated in the first transaction log; and after the copying to the data store is complete, freeing the first transaction log; responsive to a write instruction of the one or more instructions of the transaction: writing a data value of the write instruction to an entry of a cache, where the entry is marked as being associated with the transaction; and writing the data value of the write instruction to a second transaction log in the persistent memory; after execution of the one or more instructions of the transaction, marking the second transaction log as 'pending'; and when all values in the transaction have been written back to the data store, marking the second transaction log as 'free'.

2. The method of item 1, where: marking the second transaction log as 'free' comprises resetting a first flag stored in persistent memory; and marking the second transaction log as 'pending' comprises setting a second flag stored in persistent memory in response to an instruction to commit data modified in the transaction.

3. The method of item 2, further comprising, responsive to an instruction to begin the transaction: assigning, as the second transaction log, a free transaction log in the persistent memory to the transaction; and marking the second transaction log as 'in use', by setting the first flag stored in persistent memory.

4. The method of item 3, further comprising providing the free transaction log by copying contents of a 'pending' transaction log to the persistent memory.

5. The method of item 1, where the entry in the cache is marked to associate it with the transaction and with the second transaction log.

6. The method of item 5, further comprising: after execution of the one or more instructions of the transaction, unmarking an entry of the cache when the entry is written back to the data store to disassociate the line with the transaction.

7. The method of item 1, further comprising detecting requests from a second execution thread to access data in marked entries of the cache.

8. The method of item 1, further comprising aborting the transaction when a marked entry is evicted from the cache.

9. The method of item 1, further comprising freeing second transaction log when the transaction is aborted.

10. A method of executing a transaction in a data processing system, where the transaction is performed by a first execution thread and comprises one or more instructions, the method comprising: responsive to each memory access of the transaction, updating a first transaction log in a persistent memory; after execution of the one or more instructions of the first transaction and when the transaction log is complete, marking the transaction log as 'pending'; when all values modified in the r transaction have been written back to the persistent memory, marking the transaction log as 'free'; and when, following a reboot of the data processing system, a transaction log is marked as 'pending': copying data stored in the transaction log to the persistent memory at addresses indicated in the transaction log; and after the copying from the transaction log to a persistent memory is complete, marking the transaction log as 'free'.

11. A data processing system comprising: a processor core configured to execute a transaction, where the transaction is performed by a first execution thread and comprises one or more instructions; a cache accessible by the processing core, where a line of the cache includes a transaction identifier that is set when the line contains data accessed in the transaction; a first persistent memory configured to store a transaction log; a persistent storage location configured to store a status indicator that indicates when the transaction log 'pending' and is to be processed following a reboot of the data processing system; a memory controller; a second persistent memory accessible by the processing core via the memory controller; and reboot logic configured to update, following a reboot of the data processing system, the second persistent memory in accordance with the transaction log when the status indicator indicates the transaction log to be 'pending'.

12. The data processing system of item 11, where reboot logic is further configured to set the status indicator to indicate that the transaction log is 'free', when updating the second persistent memory in accordance with the transaction log is complete.

13. The data processing system of item 11, further comprising a coherence controller configured to detect requests from a second execution thread to access data in the transaction log of the first execution thread.

14. The data processing system of item 13, where the coherence controller implements a coherence protocol and where a line of the cache includes: a line condition identifier that indicates when the line is in a 'modified' condition of the coherence protocol.

15. The data processing system of item 11, where the processor is configured to abort the first transaction when a second execution thread requests access to data in the transaction log of the first execution thread.

16. The data processing system of item 11, where, within the transaction, read operations to addresses in the transaction log are directed to the cache.

17. The data processing system of item 11, where the first persistent memory comprises a portion of the second persistent memory.

18. The data processing system of item 11, where the line of the cache includes: an identifier that associates the transaction with the transaction log.

19. The data processing system of item 11, further comprising a counter, where the counter is incremented when a line is added to the cache during the transaction and is decremented when a line, associated with the transaction, is evicted from the cache and written back to persistent memory.

20. The data processing system of item 19, where the transaction log associated with the transaction is freed when the counter reaches zero, indicating that all cache lines associated with the transaction have been written back to persistent memory.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method of executing a transaction in a data processing system, where the transaction is performed by a first execution thread and comprises one or more instructions, the method comprising:
   when, following a reboot of the data processing system, a first transaction log is indicated to be 'pending', where the first transaction log is stored in a persistent memory and is associated with a prior transaction:
      copying data stored in the first transaction log to a data store at addresses indicated in the first transaction log, and
      after the copying to the data store is complete, freeing the first transaction log;
   responsive to a write instruction of the one or more instructions of the transaction:
      writing a data value of the write instruction to an entry of a cache, where the entry is marked as being associated with the transaction, and
      writing the data value of the write instruction to a second transaction log in the persistent memory;
   after execution of the one or more instructions of the transaction, marking the second transaction log as 'pending'; and
   when all values in the transaction have been written back to the data store, marking the second transaction log as 'free'.

2. The method of claim 1, where:
   marking the second transaction log as 'free' comprises resetting a first flag stored in the persistent memory; and
   marking the second transaction log as 'pending' comprises setting a second flag stored in the persistent memory in response to an instruction to commit data modified in the transaction.

3. The method of claim 2, further comprising, responsive to an instruction to begin the transaction:
   assigning, as the second transaction log, a free transaction log in the persistent memory to the transaction; and
   marking the second transaction log as 'in use' by setting the first flag stored in the persistent memory.

4. The method of claim 3, further comprising providing the free transaction log by copying contents of a 'pending' transaction log to the persistent memory.

5. The method of claim 1, where the entry in the cache is marked to associate it with the transaction and with the second transaction log.

6. The method of claim 5, further comprising:
   after execution of the one or more instructions of the transaction, unmarking the entry of the cache when the entry is written back to the data store to disassociate the entry of the cache with the transaction.

7. The method of claim 1, further comprising detecting requests from a second execution thread to access data in marked entries of the cache.

8. The method of claim 1, further comprising aborting the transaction when a marked entry is evicted from the cache.

9. The method of claim 1, further comprising freeing the second transaction log when the transaction is aborted.

10. A method of executing a transaction in a data processing system, where the transaction is performed by a first execution thread and comprises one or more instructions, the method comprising:
   responsive to each memory access of the transaction, updating a transaction log in a persistent memory;
   after execution of the one or more instructions of the transaction and when the transaction log is complete, marking the transaction log as 'pending';

when all values modified in the transaction have been written back to the persistent memory, marking the transaction log as 'free'; and when, following a reboot of the data processing system, the transaction log is marked as 'pending':
- copying data stored in the transaction log to the persistent memory at addresses indicated in the transaction log, and
- after the copying from the transaction log to the persistent memory is complete, marking the transaction log as 'free'.

11. A data processing system comprising:
a processor core configured to execute a transaction, where the transaction is performed by a first execution thread and comprises one or more instructions;
a cache accessible by the processing core, where a line of the cache includes a transaction identifier that is set when the line contains data accessed in the transaction;
a first persistent memory configured to store a transaction log;
a persistent storage location configured to store a status indicator that indicates when the transaction log is 'pending' and is to be processed following a reboot of the data processing system;
a memory controller;
a second persistent memory accessible by the processing core via the memory controller; and
reboot logic configured to update, following the reboot of the data processing system, the second persistent memory in accordance with the transaction log when the status indicator indicates the transaction log to be 'pending'.

12. The data processing system of claim 11, where the reboot logic is further configured to set the status indicator to indicate that the transaction log is 'free' when updating the second persistent memory in accordance with the transaction log is complete.

13. The data processing system of claim 11, further comprising a coherence controller configured to detect requests from a second execution thread to access data in the transaction log of the first execution thread.

14. The data processing system of claim 13, where the coherence controller implements a coherence protocol and where the line of the cache includes:
a line condition identifier that indicates when the line is in a 'modified' condition of the coherence protocol.

15. The data processing system of claim 11, where the processor core is configured to abort the transaction when a second execution thread requests access to data in the transaction log of the first execution thread.

16. The data processing system of claim 11, where, within the transaction, read operations to addresses in the transaction log are directed to the cache.

17. The data processing system of claim 11, where the first persistent memory comprises a portion of the second persistent memory.

18. The data processing system of claim 11, where the line of the cache includes:
an identifier that associates the transaction with the transaction log.

19. The data processing system of claim 11, further comprising a counter, where the counter is incremented when a line is added to the cache during the transaction and is decremented when a line, associated with the transaction, is evicted from the cache and written back to persistent memory.

20. The data processing system of claim 19, where the transaction log associated with the transaction is freed when the counter reaches zero, indicating that all cache lines associated with the transaction have been written back to the persistent memory.

* * * * *